US007276872B2

(12) United States Patent
Nishimura et al.

(10) Patent No.: US 7,276,872 B2
(45) Date of Patent: Oct. 2, 2007

(54) POWER WINDOW DEVICE

(75) Inventors: Kozo Nishimura, Aichi (JP); Seiichi Watanabe, Aichi-ken (JP); Masahiro Kasai, Aichi-ken (JP); Takashi Kikuta, Kariya (JP); Yukio Isomura, Chita (JP)

(73) Assignees: Kabushiki Kaisha Tokai Rika Denki Seisakusho, Aichi (JP); Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/305,990

(22) Filed: Dec. 19, 2005

(65) Prior Publication Data

US 2006/0142992 A1 Jun. 29, 2006

(30) Foreign Application Priority Data

Dec. 24, 2004 (JP) ............................ 2004-374363

(51) Int. Cl.
*G05B 5/00* (2006.01)

(52) U.S. Cl. ...................... 318/466; 318/469; 318/286; 318/434

(58) Field of Classification Search ................ 318/466, 318/469, 286, 436, 430, 432, 445, 453, 465, 318/467, 468, 472, 280
See application file for complete search history.

(56) References Cited

U.S. PATENT DOCUMENTS

2004/0227483 A1* 11/2004 Katsumata et al. ......... 318/469

FOREIGN PATENT DOCUMENTS

JP 2001-020601 A 1/2001
JP 2004-312957 A 11/2004

* cited by examiner

*Primary Examiner*—Karen Masih
(74) *Attorney, Agent, or Firm*—Crompton, Seager & Tufte, LLC

(57) ABSTRACT

A power window device for lowering and raising window glasses. A window switch is operated to move a corresponding window glass. A motor drives the window glass when the window switch is operated. An ECU is provided for each window glass to control the motor in accordance with the operation of the window switch. An engine switch shifts positions to drive an engine. A control signal generator generates a signal to validate or invalidate control of the ECU over the motor. A control circuit determines that a signal wire connecting the ECUs to the control signal generator is in an unexpected condition when a signal cannot be received. The control circuit overrides the signals generated by the control signal generator when the signal wire is in an unexpected condition.

9 Claims, 3 Drawing Sheets

POWER WINDOW DEVICE

CROSS-REFERENCE TO RELATED APPLICATION

This application is based on and claims priority under 35 U.S.C. §119 with respect to Japanese Patent Application No. 2004-374363, filed on Dec. 24, 2005, the entire contents of which are incorporated herein by reference.

BACKGROUND OF THE INVENTION

The present invention relates to a power window device for automatically lowering and raising a window member by operating a switch.

In the prior art, a power window device is installed in a door of a vehicle to facilitate the lowering and raising of a window glass (opening and closing of a window) in the door. The power window device includes a window switch, which is arranged in a passenger compartment (e.g., inner side of the door) and operated by a vehicle occupant. Operation of the window switch drives a drive motor, such as a DC motor, so as to automatically lower or raise the window glass. When the window switch is operated to open the window, the drive motor produces normal rotation and lowers the window glass. When the window switch is operated to close the window, the drive motor produces reverse rotation and raises the window glass.

FIG. 4 is a block diagram showing one example of a power window device 51. The power window device 51 includes a plurality of drive units 52 to 55 for lowering and raising associated window glasses. In this example, there are four drive units 52 to 55, one for a driver door, one for a front passenger door, one for a rear right door, and one for a rear left door. The drive units 52 to 55 respectively include electronic control units (ECUs) 56 to 59. Each of the drive units 52 to 55 further includes a window switch 61 and a drive motor 60. The window switch 61 is operated to drive the drive motor 60 and lower or raise the window glass accordingly.

The driver door ECU 56 functions as a master ECU for the front passenger door ECU 57, the rear right door ECU 58, and the rear left door ECU 59 to validate and invalidate operation of the ECUs 57 to 59. A driver uses an engine switch to start the engine. When the engine starts to run, the engine switch is shifted to an ignition (IG) position. The driver door ECU 56 monitors the engine switch. When determining that the ignition switch is located at the IG position, the driver door ECU 56 cyclically transmits a validation signal Sr to the ECUs 57 to 59 through a signal path, or signal wire 62. Control of the ECUs 57 to 59 over the drive motors 60 is validated when the ECUs 57 to 59 receive the validation signal Sr. Conversely, when determining that the engine switch is not located at the IG position and the engine is thus not running, the driver door ECU 56 cyclically transmits an invalidation signal Sy to the ECUs 57 to 59 through the signal path, or signal wire 62. Control of the ECUs 57 to 59 over the drive motors 60 is invalidated when receiving the invalidation signal Sy. In this state, the corresponding window glass cannot be lowered and raised even if the window switch 61 is operated.

Current may leak from the signal wire 62 when the power window device 51 is exposed to moisture. In other cases, the signal wire 62 may be broken when a short circuit occurs. Under such circumstances, the signal wire 62 is substantially in an unexpected condition. Thus, the driver door ECU 56 cannot properly communicate with the ECUs 57 to 59, which function as slaves. The slave ECUs 57 to 59 are each provided with a function for detecting such a state in which the signal wire 62 is in an unexpected condition (refer to, for example, Japanese Laid-Open Patent Publication No. 2004-312957). When the signal wire 62 is determined as being in an unexpected condition, further operation of each of the ECUs 57 to 59 is invalidated.

In this manner, by invalidating control of the ECUs 57 to 59, the window glasses are not erroneously operated. However, the driver door ECU 56 is directly connected to the ignition switch IG. Thus, even if the signal wire 62 is in an unexpected condition, control of the driver door ECU 56 is continuously enabled.

However, problems may occur if the power window device 51 cannot be operated from the front passenger seat and the left and rear right passenger seats when the signal wire 62 is in an unexpected condition. For example, if the signal wire 62 is in an unexpected condition in a state in which the window is open, the window cannot be closed from the front passenger seat and the left and rear right passenger seats when it starts to rain. Further, if the vehicle becomes submerged in water and the signal wire 62 is in an unexpected condition, the power window device 51 would not operate when a vehicle occupant tries to open a window from the front passenger seat, the rear left passenger seat, or the rear right passenger seat. This would not be desirable in a state of emergency.

SUMMARY OF THE INVENTION

It is an object of the present invention to provide a power window device that enables the lowering and raising of a window glass from a seat other than the driver seat when a signal wire is in an unexpected condition while ensuring the safety of the vehicle occupants.

One aspect of the present invention is a power window device for lowering and raising any one of a plurality of window members. The power window device includes a plurality of window switches, each provided for one of the window members and operated when lowering and raising its corresponding window member, a plurality of motors, each connected to one of the window switches for driving the corresponding window member when the window switch is operated, and a plurality of control units, each provided for one of the window members and connecting the corresponding window switch and motor to control the motor in accordance with the operation of the window switch. A signal path, connecting the control units, transmits a validation signal that validates the control of each control unit over the corresponding motor and an invalidation signal that invalidates the control of each control unit over the corresponding motor. Each control unit includes an unexpected condition determination means for determining whether the signal path is in an unexpected condition. Each control unit also includes an override means for validating the control of each control unit over the corresponding motor by overriding the signal transmitted through the signal path when the unexpected condition determination means determines that the signal path is in an unexpected condition, and for preventing the corresponding window member from entrapping an object.

Another aspect of the present invention is a power window device for lowering and raising any one of a plurality of window members in a vehicle having an engine. The power window device includes a plurality of window switches, each provided for one of the window members and operated when lowering and raising its corresponding window member, a plurality of motors, each connected to one of the window switches for driving the corresponding window member when the window switch is operated, and a plurality of control units, each provided for one of the window members and connecting the corresponding window switch and motor to control the motor in accordance with the operation of the window switch. A signal path connects the control units. An engine switch, connected to the control units, shifts between a position for driving the engine and a position for stopping the engine. A control signal generator, connected between the engine switch and the signal path, transmits a validation signal through the signal path when the engine switch is shifted to the position for driving the engine so as to validate the control of each control unit over the corresponding motor and for transmitting an invalidation signal through the signal path when the engine switch is shifted to the position for stopping the engine so as to invalidate the control of each control unit over the corresponding motor. Each control unit includes a control circuit for determining that the signal path is in an unexpected condition when neither the validation signal and the invalidation signal can be received for a predetermined period, validates the control of each control unit over the corresponding motor by overriding the signal generated by the control signal generator when determining that the signal path is in an unexpected condition, and monitors entrapment of an object by the corresponding window member to stop or reverse movement of the window member when the window member entraps an object.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A power window device 1 according to a preferred embodiment of the present invention will now be discussed with reference to FIGS. 1 and 2.

Figure 1:
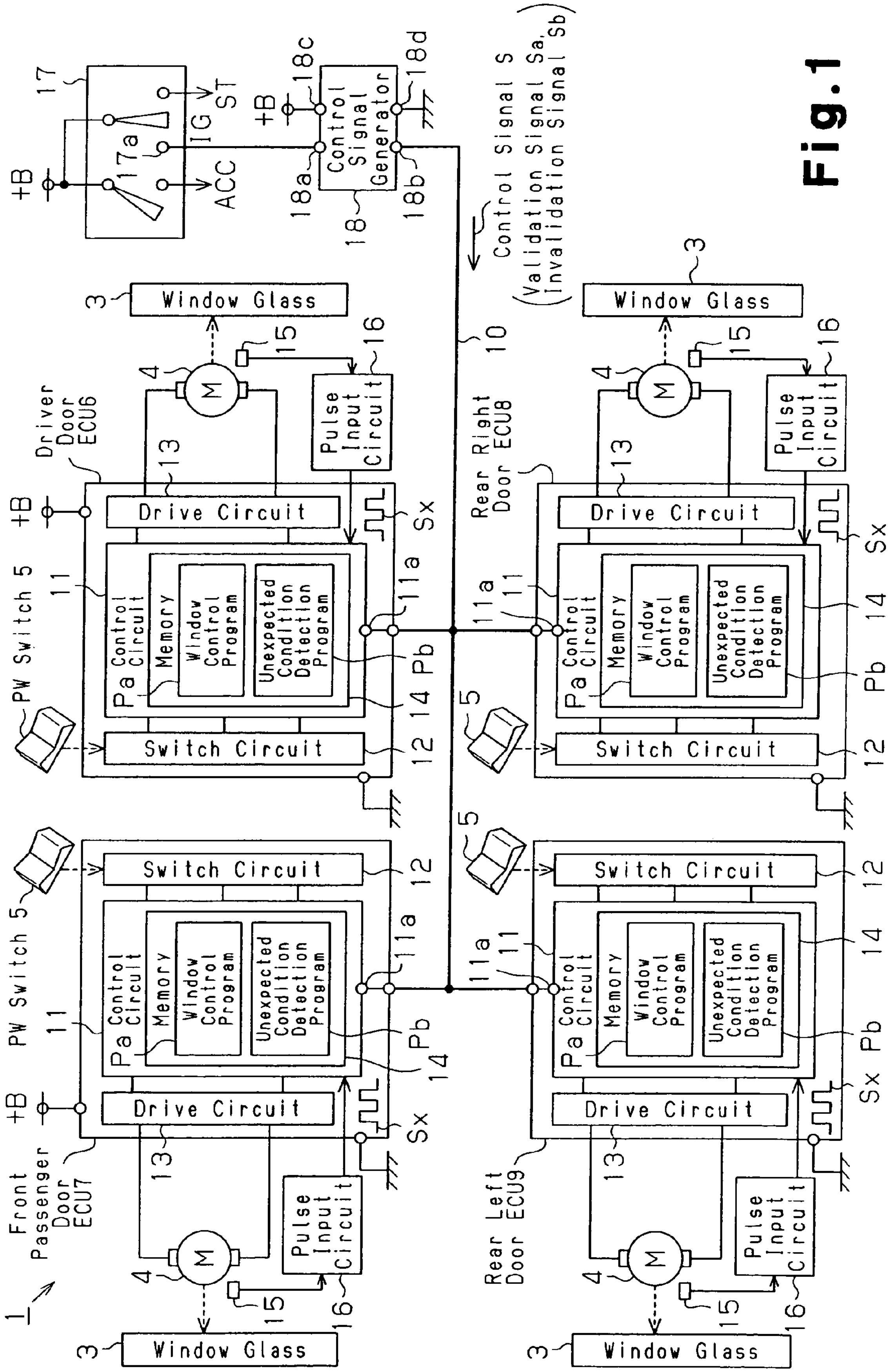
FIG. 1 is an electric circuit diagram of a power window device according to a preferred embodiment of the present invention.
Figure 2:
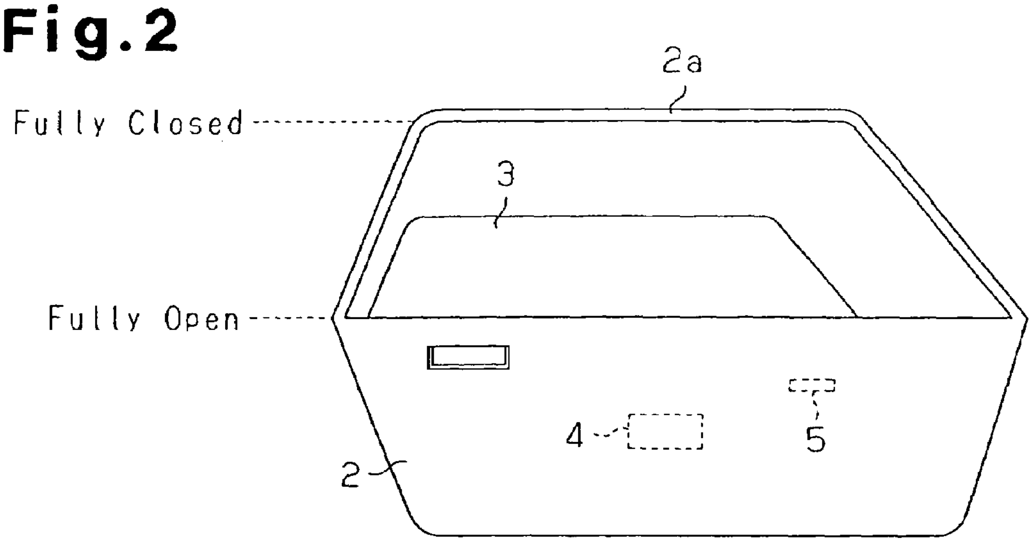
FIG. 2 is a side view showing a vehicle door.

FIG. 1 is an electric circuit diagram of the power window device 1. In this embodiment, the power window device 1 automatically lowers and raises a window glass 3 of a vehicle door 2 (refer to FIG. 2) using drive force that is generated by a drive motor 4. A power window (PW) switch 5 is operated to drive the drive motor 4 and lower or raise the window glass 3. A PW switch 5 and a drive motor 4 are provided for each door 2. The window glass 3 functions as a window member, and the drive motor 4 functions as a drive source.

The PW switch 5 is located at the inner side of the door 2 and is provided with a lowering function, a raising function, and an automatic operation function. More specifically, the PW switch 5 is a two-step click type tilt switch. The PW switch 5 is pushed one step toward one side (lowering side) to activate a lowering switch and lower the window glass 3. Further, the PW switch 5 is pushed one step toward the other side (raising side) to activate a raising switch and raise the window glass 3. The PW switch 5 is also pushed two steps toward either the lowering side or the raising side. This activates the associated switch in an automatic state in which the window glass 3 is continuously lowered or raised until the PW switch 5 is operated again. For example, a direct current (DC) motor is used as the drive motor 4. The drive motor 4 is connected to the window glass 3 by a transmission mechanism (not shown), which converts motor torque to vertical linear motion. For example, when the drive motor 4 produces normal rotation, the transmission mechanism converts the torque of the motor 4 to downward linear motion. This downward force lowers the window glass 3. When the drive motor 4 produces reverse rotation, the transmission mechanism converts the torque of the drive motor 4 to upward linear motion. This upward force raises the window glass 3.

Referring to FIG. 1, the power window device 1 controls each drive motor 4 based on the switch operation of the corresponding PW switch 5. The power window device includes a plurality of electronic control units (ECU) 6 to 9, one for each window glass 3 to control the lowering and raising of the window glass 3. In this embodiment, there are four ECUs, a driver door ECU 6, a front passenger door ECU 7, a rear right door ECU 8, and a rear left door ECU 9. A signal path, or signal wire 10, connects the ECUs 6 to 9 to one another in a manner enabling communication.

Each of the ECUs 6 to 9 includes a control circuit 11, a switch circuit 12 for outputting an electric signal indicating the state of the PW switch 5, and a drive circuit 13 for driving the drive motor 4 in accordance with a command from the control circuit 11. The switch circuit 12 connects the input side of the control circuit 11 to the PW switch 5. The drive circuit 13 connects the output side of the control circuit 11 to the drive motor 4. The control circuit 11 functions as an unexpected condition determination means, an override means, an entrapment determination means, and a window control means.

Each control circuit 11 includes a memory 14 configured by a read only memory (ROM) or a random access memory (RAM). The memory 14 stores a window control program Pa, which is executed when lowering and raising the window glass 3. When the corresponding PW switch 5 is pushed toward the raising side, the window control program Pa has the drive motor 4 produce rotation in one direction at a predetermined speed to raise the window glass 3. Further, when the corresponding PW switch 5 is pushed toward the lowering side, the window control program Pa has the drive motor 4 produce rotation in the other direction at a predetermined speed to lower the window glass 3. When the PW switch 5 is operated, the control circuit 11 functions in accordance with the window control program Pa stored in the memory 14 to control the drive motor 4 with the drive circuit 13 and lower or raise the window glass.

The window control program Pa includes an entrapment prevention process for preventing entrapment of an object, such as a vehicle occupant's finger, between the window glass 3 and a window frame 2a (refer to FIG. 2) when closing the window. If the entrapment of an object between the window glass 3 and the window frame 2a is determined when raising the window glass 3, the entrapment prevention process stops the window glass 3 or has the drive motor 4 produce rotation in the opposite direction. Accordingly, the window control program Pa functions as the entrapment determination means and the window control means.

The entrapment prevention process will now be described in more detail. The power window device 1 includes a pulse sensor 15 for each drive motor 4 to detect the speed of the rotation produced by the corresponding drive motor 4. Each pulse sensor 15 is connected to the corresponding control circuit 11 by a pulse input circuit 16. The pulse sensor 15 sends a pulse signal Sx that is in accordance with the detected rotation speed of the drive motor 4 to the control circuit 11 via the pulse input circuit 16. Based on the received pulse signal Sx, the control circuit 11 calculates the rotation speed of the drive motor 4 (drive amount of the drive motor 4 per unit time) and determines the present position of the window glass 3. The pulse sensors 15 and the pulse input circuits 16 function as a drive detection means.

In this embodiment, the entrapment prevention process is performed based on the pulse signal Sx from the pulse sensor 15. More specifically, the pulse cycle of the pulse signal Sx is short when the rotation speed of the drive motor 4 is high and becomes long when the rotation speed decreases. This factor is used to detect entrapment of an object when the pulse cycle changes.

The vehicle includes an engine switch 17 (ignition switch), which is operated to start the engine. A vehicle key (not shown) is inserted into a key cylinder located near the steering shaft and turned to shift the engine switch 17 to four positions, an OFF position, an ACC position (accessory position), an IG position (ignition position), and a START position. The OFF position is the position in which the vehicle key is inserted into and removed from the key cylinder. The engine switch 17 is shifted to the ACC position for enabling use of an accessory such as a radio when the engine is not running. The engine switch 17 is shifted to the IG position when the vehicle is being driven and to the START position when starting the engine. When the engine switch 17 is located at the IG position, the engine switch 17 sends an IG ON signal to the control signal generator 18.

The power window device 1 includes a control signal generator 18 for validating or invalidating the control of each of the ECUs 6 to 9 over the corresponding drive motors 4 based on the position of the engine switch 17. The control signal generator 18 includes an input terminal 18a, which is connected to an IG terminal 17a of the engine switch 17, and an output terminal 18b, which is connected to the control circuit 11 of each ECU 6 to 9 by the signal wire 10. Further, the control signal generator 18 includes a power supply terminal 18c, which is connected to a vehicle battery B, and a ground terminal 18d, which is connected to ground. The control signal generator 18 functions as a signal control unit.

The control signal generator 18 sends a control signal S, which is in accordance with the state of the engine switch 17, to each of the ECUs 6 to 9. This, for example, enables the lowering and raising of each window glass 3 when the engine switch 17 is located at the IG position and disables lowering and raising of each window glass 3 when the engine switch 17 is located at positions other than the IG position. More specifically, the control signal generator 18 outputs a validation signal Sa as the control signal S to validate control of the ECUs 6 to 9 over the corresponding drive motors 4 when the engine switch 17 is located at the IG position. Further, the control signal generator 18 outputs an invalidation signal Sb as the control signal S to invalidate operation of the ECUs 6 to 9 over the corresponding drive motors 4 when the engine switch 17 is located at a position other than the IG position. The control signal S functions as a communication signal.

In each of the ECUs 6 to 9, the control circuit 11 has an input terminal 11a connected to the signal wire 10. The control circuit 11 sets the control state of the corresponding ECU 6 to 9 over the drive motor 4 in accordance with the control signal S (validation signal Sa or invalidation signal Sb) received through the input terminal 11a. More specifically, if the control circuit 11 receives the validation signal Sa from the control signal generator 18, the control circuit 11 enables the lowering and raising of the corresponding window glass 3 with the PW switch 5. If the control circuit 11 receives the invalidation signal Sb from the control signal generator 18, the control circuit 11 disables the lowering and raising of the window glass 3 with the PW switch 5.

Accordingly, if the engine switch 17 is located at the IG position, each window glass 3 can be lowered and raised with the corresponding PW from a driver's seat, a front passenger seat, and rear passenger seats. If the engine switch 17 is located at a position other than the IG position (e.g., OFF position or ACC position), the control of the ECUs 6 to 9 over the corresponding drive motors 4 is invalidated. Thus, the ECUs 6 to 9 do not respond to the operation of any PW switch 5 and the window glasses 3 thus cannot be lowered or raised.

Each memory 14 also stores an unexpected condition detection program Pb. The unexpected condition detection program Pb is executed to determine whether the signal wire 10 is in an unexpected condition based on the state of the signal input at the input terminal 11a of each control circuit 11. Further, the unexpected condition detection program Pb is executed in predetermined cyclic intervals regardless of whether the engine is running or not. The unexpected condition detection program Pb does not necessarily have to be stored in the same memory as the window control program Pa. For example, the window control program Pa may be stored in a ROM installed in the vehicle from the beginning, and the unexpected condition detection program Pb may be stored in a ROM that is subsequently added to the vehicle. The unexpected condition detection program Pb functions as the unexpected condition determination means and the override means.

In this embodiment, the unexpected condition detection program Pb is used to determine that the signal wire 10 is in an unexpected condition when the control circuits 11 does not receive the control signal S (validation signal Sa or invalidation signal Sb) for a predetermined period. The signal wire 10 is in an unexpected condition, for example, if a current leakage occurs in the signal wire 62 when the power window device 1 (ECUs 6 to 9) is exposed to moisture or if the signal wire 10 breaks due to short circuiting. When the signal wire 10 is in an unexpected condition, the ECUs 6 to 9 may not be able to properly receive the control signal S from the control signal generator 18. Thus, the control state of the ECUs 6 to 9 over the drive motors 4 may not be appropriately set in accordance with the command from the control signal generator 18.

Each control circuit 11 executes the unexpected condition detection program Pb in predetermined cyclic intervals. If the control signal S is not received, the control circuit 11 determines that the signal wire 10 is in an unexpected condition. In this case, the control circuit 11 overrides the control signal generator 18 and validates control of the corresponding ECU 6 to 9 over the drive motors 4. More specifically, if any of the ECUs 6 to 9 determines that the signal wire 10 is in an unexpected condition, the ECU 6 to 9 is allowed to execute the window control program Pa so that when the PW switch 5 is operated, the drive motor 4 lowers or raises the corresponding window glass 3. In such a state, regardless of the position the engine switch 17 is shifted to, the window glasses 3 can be lowered and raised with the PW switches 5 from any seat.

The operation of the power window device 1 will now be discussed.

In a normal state, the signal wire 10 is not in an unexpected condition. Thus, if the engine switch 17 is located at the OFF position or the ACC position, the engine switch 17 does not send the IG ON signal to the control signal generator 18. Accordingly, the control signal generator 18 determines that the engine switch 17 is located at a position other than the IG position and sends an invalidation signal Sb to the ECUs 6 to 9. This invalidates operation of the ECUs 6 to 9. In this state, the window glasses 3 cannot be lowered nor raised from any seat with the corresponding PW switches 5.

If the engine switch 17 is then shifted to the IG position from the OFF position via the ACC position, the engine switch 17 sends the IG ON signal to the control signal generator 18. Thus, the control signal generator 18 determines that the engine switch 17 is located at the IG position and sends the validation signal Sa to the ECUs 6 to 9 via the signal wire 10. This enables the ECUs 6 to 9 to execute the window control program Pa.

Accordingly, the window glasses 3 can be lowered and raised from any of the driver's seat, the front passenger seat, and the rear left and right passenger seats with the corresponding PW switches 5. For example, if the PW switch 5 for the driver's seat is operated, the window glass 3 of the driver door is lowered or raised. If the PW switch 5 for the front passenger seat is operated, the window glass 3 of the front passenger door is lowered or raised. If the PW switch 5 for the rear left passenger seat is operated, the window glass 3 of the rear left door is lowered or raised. If the PW switch 5 for the rear right passenger seat is operated, the window glass 3 of the rear right door is lowered or raised.

In this state, the signal wire 10 may fall into an unexpected condition if current leakage occurs due to moisture or if the signal wire 10 is broken due to a short-circuit. In this state, the control circuits 11 of the ECUs 6 to 9 cannot receive the validation signal Sa and the invalidation signal Sb. Each control circuit 11 constantly executes the signal wire unexpected condition detection program Pb. Thus, when the signal wire 10 is in an unexpected condition, the control circuit 11 determines that the signal wire 10 is in an unexpected condition. When the control circuit 11 detects that the signal wire 10 is in an unexpected condition, the control circuit 11 overrides the signal transmitted through the signal wire 10 and allows for execution of the window control program Pa.

Accordingly, when the signal wire 10 is in an unexpected condition, the window glasses 3 may still be lowered and raised from any seat with the PW switches 5 regardless of the position the engine switch 17 is shifted to. Thus, a window glass 3 may be lowered or raised by operating the corresponding PW switch 5. That is, in addition to the window glass 3 of the driver door, the window glasses 3 of the front passenger door and the rear left and right doors can be lowered and raised with the corresponding PW switches 5.

In this embodiment, when the signal wire 10 is in an unexpected condition, the window glasses 3 of the driver door, the front passenger door, and the rear left and right doors may still be lowered and raised even if the vehicle becomes submerged in water.

Each of the ECUs 6 to 9 executes the entrapment prevention process, which serves as a safety function, even when the signal wire 10 is in an unexpected condition. Accordingly, when the signal wire 10 is in an unexpected condition and the ECUs 6 to 9 thus control the lowering and raising of the corresponding window glass 3 independently from the control signal generator 18, the entrapment prevention process prevents entrapment of an object, such as a finger, when raising the window glass 3 to close the window. This ensures the safety of the vehicle occupants even if the signal wire 10 is in an unexpected condition.

The preferred embodiment has the advantages described below.

(1) When the signal wire 10 is determined to be in an unexpected condition, the control of the ECUs 6 to 9 over the drive motors 4 is continuously allowed. Thus, the ECUs 6 to 9 execute the window control program Pa and the entrapment prevention process in a manner independent from the control signal generator 18. Accordingly, even if the signal wire 10 is in an unexpected condition, the window glasses 3 may be lowered and raised from any seat while ensuring the safety of the vehicle occupants.

(2) Under a normal state in which the signal wire 10 is not in an unexpected condition, the control state of each of the ECUs 6 to 9 is determined based on the control signal S, which is output by the control signal generator 18. When the control signal S is not received for a predetermined period, each of the ECUs 6 to 9 determines that the signal wire 10 is in an unexpected condition. Accordingly, the control signal S that sets the control state of the ECUs 6 to 9 is also used to determine whether or not the signal wire 10 is in an unexpected condition. This simplifies the structure of the power window device 1.

(3) The control signal generator 18 outputs the control signal S, which determines the control state of the ECUs 6 to 9. Accordingly, each of the drive motors 4 may be controlled by the same type of ECU. Thus, for example, there would be no necessity to provide a different type of ECU for the driver seat door. Further, under a normal state, the control signal generator 18 also functions to invalidate operation of each of the ECUs 6 to 9 if the engine switch 17 is shifted to a position other than the IG position so that the window glasses 3 cannot be lowered and raised from any one of the vehicle seats. This simplifies the structure of the power window device 1.

(4) When functioning independently from the control signal generator 18, each of the ECUs 6 to 9 executes the window control program Pa, which includes an entrapment prevention process. Accordingly, entrapment of an object, such as a finger, is prevented when a window glass 3 is raised to close the corresponding window regardless of whether the ECUs 6 to 9 function independently from the control signal generator 18. Therefore, the power window device 1 has a high level of safety.

It should be apparent to those skilled in the art that the present invention may be embodied in many other specific forms without departing from the spirit or scope of the invention. Particularly, it should be understood that the present invention may be embodied in the following forms.

Figure 3:
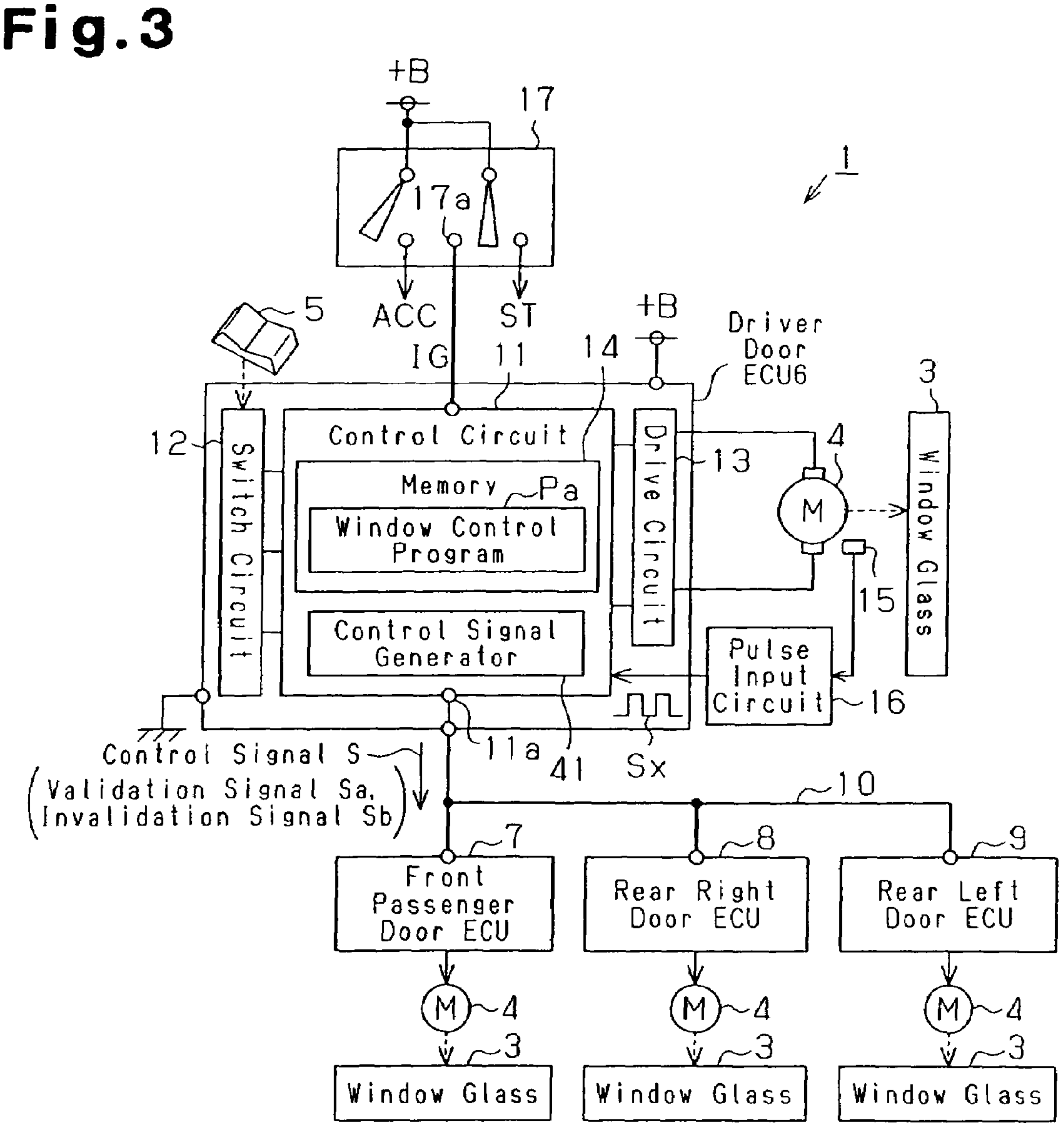
FIG. 3 is an electric circuit diagram of a power window device according to a further embodiment of the present invention.
Figure 4:
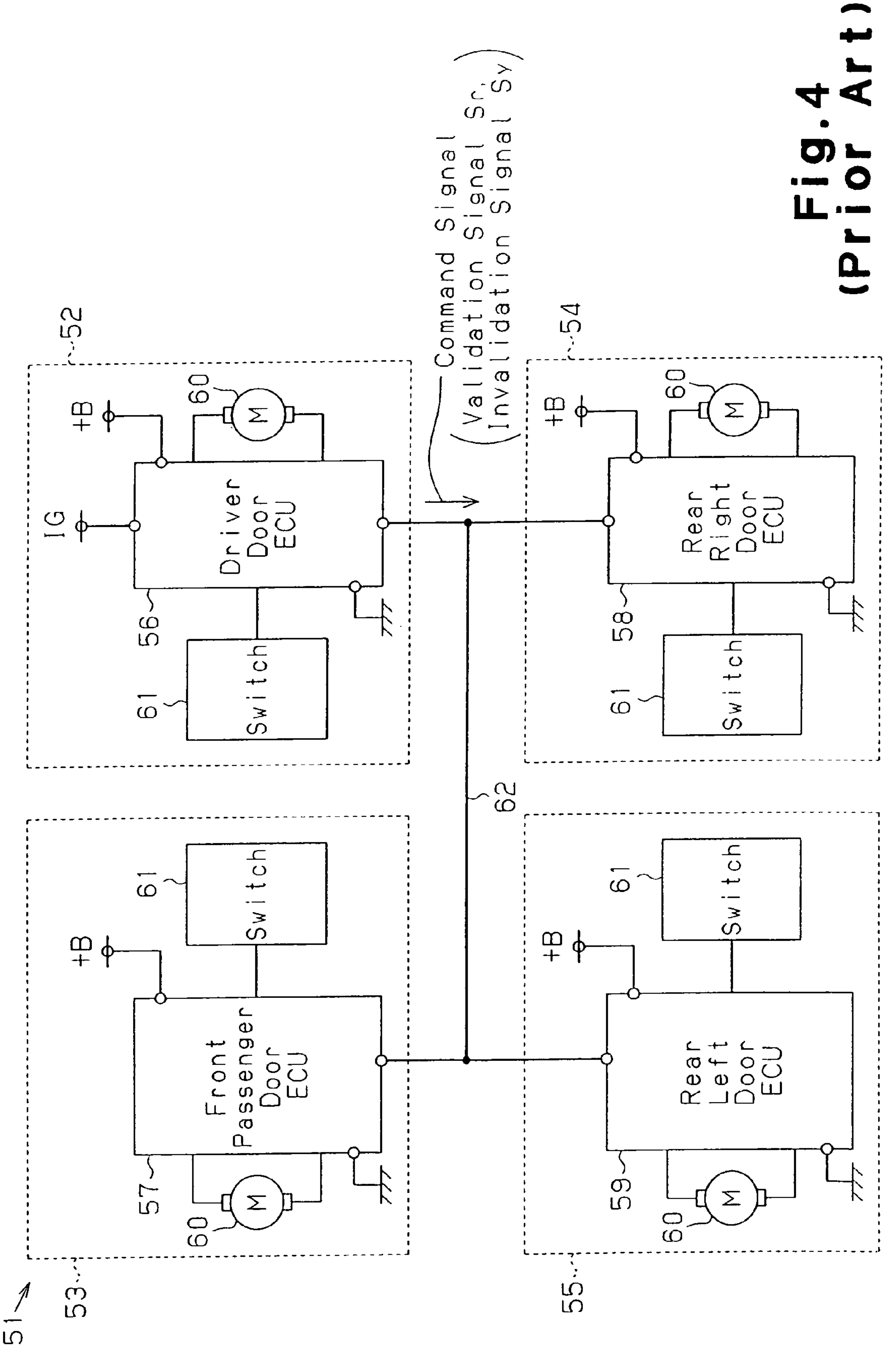
Fig.4 (Prior Art)
FIG. 4 is a block diagram showing one example of a power window device in the prior art.

The transmission of the control signal S (validation signal Sa and invalidation signal Sb) does not necessarily have to be executed by the control signal generator 18. For example, as shown in FIG. 3, the control signal generator 18 may be eliminated and the control circuit 11 of the driver door ECU 6 may be connected to the engine switch 17 and include a control signal generator 41 having the same functions as the control signal generator 18. In this case, the control signal generator 41 monitors the position of the engine switch 17 and outputs a control signal S accordingly.

In the preferred embodiment, the engine switch 17 is for a mechanical key system that uses a mechanical key to shift switch positions. Instead, the engine switch 17 may be part of, for example, an electronic key system that authenticates the ID code of a key through wireless communication. In this case, the engine switch may be a rotatable knob or a button. For example, when the key is authenticated through wireless communication, the driver rotates the knob or pushes the button to start the engine.

The pulse sensor 15 for detecting the rotation speed of the drive motor 4 may be any type of sensor, for example, an optical sensor or a magnetic sensor. Further, the rotation speed of the drive motor 4 does not necessarily have to be detected by the pulse sensor 15 and may be detected by any device as long as it can detect the rotation speed.

The power window device 1 of the preferred embodiment is employed for window glasses 3 of a vehicle. However, the power window device 1 may also be employed for window glasses of buildings, such as houses. Further, the vehicle does not have to be an automobile and may be any type of vehicle, such as a train or an industrial vehicle.

The present examples and embodiments are to be considered as illustrative and not restrictive, and the invention is not to be limited to the details given herein, but may be modified within the scope and equivalence of the appended claims.

What is claimed is:

1. A power window device for lowering and raising any one of a plurality of window members, the power window device comprising:

a plurality of window switches, each provided for one of the window members and operated when lowering and raising its corresponding window member;

a plurality of motors, each connected to one of the window switches for driving the corresponding window member when the window switch is operated;

a plurality of control units, each provided for one of the window members and connecting the corresponding window switch and motor to control the motor in accordance with the operation of the window switch; and a signal path, connecting each control unit, for transmitting a validation signal that validates the control of each control unit over the corresponding motor and an invalidation signal that invalidates the control of each control unit over the corresponding motor, wherein each control unit includes;

an unexpected condition determination means for determining whether the signal path is in an unexpected condition in which neither the transmitted validation signal nor the transmitted invalidation signal is received by the control unit; and an override means for validating the control of the control unit over the corresponding motor by overriding the validation signal or the invalidation signal transmitted through the signal path when the unexpected condition determination means determines that the signal path is in an unexpected condition, and for preventing the corresponding window member from entrapping an object.

2. The power device according to claim 1, further comprising:

an engine switch for starting an engine;

a control signal generator, connecting the engine switch to the signal path, for generating a communication signal in accordance with the state of the engine switch and transmitting the communication signal along the wire, wherein the unexpected condition determination means determines whether the signal path is in an unexpected condition based on the communication signal received by the control unit from the signal path.

3. The power device according to claim 1, wherein each control unit further includes:

a sensor, connected to the corresponding motor, for detecting a drive amount of the motor per unit time;

an entrapment determination means for determining whether the corresponding window member has entrapped an object based on the detection of the sensor; and a window control means for controlling the motor, wherein when the entrapment determination means determines that the window member has entrapped an object, the window control means stops the motor or drives the motor so as to reverse movement of the window member.

4. The power window device according to claim 2, wherein the communication signal is any one of the validation signal and the invalidation signal.

5. A power window device for lowering and raising any one of a plurality of window members in a vehicle having an engine, the power window device comprising:

a plurality of window switches, each provided for one of the window members and operated when lowering and raising its corresponding window member;

a plurality of motors, each connected to one of the window switches for driving the corresponding window member when the window switch is operated;

a plurality of control units, each provided for one of the window members and connecting the corresponding window switch and motor to control the motor in accordance with the operation of the window switch;

a signal path connecting each control unit;

an engine switch, connected to the control units, shifted between a position for driving the engine and a position for stopping the engine;

a control signal generator, connected between the engine switch and the signal path, for transmitting a validation signal through the signal path when the engine switch is shifted to the position for driving the engine so as to validate the control of each control unit over the corresponding motor and for transmitting an invalidation signal through the signal path when the engine switch is shifted to the position for stopping the engine so as to invalidate the control of each control unit over the corresponding motor, wherein each control unit includes;

a control circuit for determining that the signal path is in an unexpected condition in which neither the validation signal nor the invalidation signal is received by the control unit for a predetermined period, validating the control of each control unit over the corresponding motor by overriding the signal generated by the control signal generator when determining that the signal path is in an unexpected condition, and monitoring entrapment of an object by the corresponding window member to stop or reverse movement of the window member when the window member entraps an object.

6. The power device according to claim 5, wherein each control unit further includes:

a sensor, connected to the corresponding motor, for detecting a drive amount of the motor per unit time, the control unit determining whether the corresponding window member has entrapped an object based on the detection of the sensor and stopping the motor or driving the motor so as to reverse movement of the window member when determining that the window member has entrapped an object.

7. The power device according to claim 5, wherein each control unit further includes:

a memory for storing a window control program, which is executed to raise and lower the corresponding window member in accordance with the operation of the corresponding window switch, and an unexpected condition detection program, which is executed to determine whether the signal path is in an unexpected condition, wherein the window control program is provided with a process for determining whether the window member has entrapped an object.

8. The power device according to claim 7, wherein each control unit executes the window control program when receiving the validation signal from the control signal generator and stops execution of the window control program when receiving the invalidation signal from the control signal generator, the control unit executing the window control program regardless of the signal from the control signal generator when determining that the signal path is in an unexpected condition through execution of the unexpected condition detection program.

9. A power window device for lowering and raising any one of a plurality of window members in a vehicle having an engine, the power window device comprising:

a plurality of window switches, each provided for one of the window members and operated when lowering and raising its corresponding window member;

a plurality of motors, each connected to one of the window switches for driving the corresponding window member when the window switch is operated;

a plurality of control units, each provided for one of the window members and connecting the corresponding window switch and motor to control the motor in accordance with the operation of the window switch;

a signal path connecting each control unit;

an engine switch, connected to the control units, shifted between a position for driving the engine and a position for stopping the engine;

a control signal generator, connected between the engine switch and the signal path, for transmitting a validation signal through the signal path when the engine is switched to the position for driving the engine so as to validate the control of each control unit over the corresponding motor and for transmitting an invalidation signal through the signal path when the engine switch is shifted to the position for stopping the engine so as to invalidate the control of each control unit over the corresponding motor, wherein each control unit includes;

a memory storing a window control program, which is executed to lower and raise the corresponding window member, and an unexpected condition detection program, which is executed to determine whether the signal path is in an unexpected condition in which neither the validation signal nor the invalidation signal is received by the control unit for a predetermined period; and a control circuit for executing the window control program and the unexpected condition detection program, validating the control of each control unit over the corresponding motor by overriding the signal generated by the control signal generator when determining through execution of the unexpected condition detection program that the signal path is in an unexpected condition, and monitoring entrapment of an object by the corresponding window member to stop or reverse movement of the window member when the window member entraps an object, wherein the control circuit executes the window control program and monitors entrapment of an object in a manner independent from the validation signal or the invalidation signal transmitted by the control signal generator when determining that the signal path is in an unexpected condition.

* * * * *